United States Patent Office 3,761,430
Patented Sept. 25, 1973

3,761,430
COMPOSITION COMPRISING A POLYIMIDE REACTION PRODUCT AND FILLED COMPOSITION MADE THEREFROM
John M. Witzel, Ballston Spa, N.Y., assignor to General Electric Company
No Drawing. Filed Oct. 7, 1971, Ser. No. 187,535
Int. Cl. C08g 20/00
U.S. Cl. 260—2.5 B               6 Claims

ABSTRACT OF THE DISCLOSURE

Polyimides prepared from the reaction of unsaturated bisimides and polyamines are provided which have good flow characteristics, are readily workable and are characterized by good electrical and physical properties including good compressive strength, resistance to humidity and elevated temperatures.

---

This invention relates to polymeric compositions which are readily processed to provide structural elements which are possessed of good electrical and physical characteristics. More particularly, the invention relates to polyimides including those having fillers prepared from aliphatically unsaturated bisimides and polyamines which retain the relatively low temperature curing characteristics of such materials but which at the same time are possessed of good working properties and superior physical qualities including resistance to humidity and elevated temperatures.

With the increasing emphasis on electrical and mechanical machinery operating at elevated temperatures in order to take advantage of the increasing efficiency and decreased space requirements obtainable under such operating conditions, there has been a corresponding requirement for polymeric or resinous materials which are readily processed and which have the required electrical and physical characteristics for such use. In electrical applications, as for radar installations, it is required that the electrical properties approach that of glass or quartz. In certain structural applications as in aerospace uses, it is required that the material be physically strong and high temperature-resistant but at the same time have little weight. In other applications such as for ablative surfaces as in nose cones and gas turbine applications, it is required that the high temperature resistance and good strength be combined with the ability to erode or renew for one or another purpose. Particularly useful as elevated temperature-resistant materials which are curable at reasonably low temperatures are the polyimide reaction products of aliphatically unsaturated bisimides and polyamines described in U.S. Pat. 3,562,223. However, it has been found that such materials especially when filled with certain fillers and particularly when filled with finely divided fillers or other materials such as hollow, generally spherical particles typified by microspheres and microballoons are not readily processed or worked into the final desired structural shape. It is a primary object of the present invention to provide new and useful polymeric compositions which are readily processed and are possessed as desired of low density, good electrical characteristics, good physical characteristics, and good and other desirable physical characteristics including good compressive strength, resistance to elevated temperatures, humidity resistance, and ablative qualities.

Briefly, according to the present invention, polyimide reaction products of aliphatically unsaturated bisimides and polyamines are blended with a monomer selected from diallyl isophthalate and N-vinyl pyrrolidone to provide useful compositions which can further be filled with carbon microspheres, high silica microballoons or carbonaceous or other pigments to provide specific characteristics. In addition, such compositions can also be blended with the usual inorganic fillers or other fillers to provide specific physical or electrical characteristics. For example, barium titanate and metal oxide, such as aluminum oxide, can be used to provide particular dielectric constant materials. Other fillers well known to those skilled in the art can also be used to achieve other specific desired characteristics.

Those features of the invention which are believed to be novel are set forth with particularity in the claims appended hereto. The invention will, however, be better understood and further objects and advantages appreciated from a consideration of the following description.

The resinous materials which are useful in connection with the present invention include those described in U.S. Pat. 3,562,223, Feb. 9, 1971, such patent being incorporated herein. Generally, the polymeric materials which are useful are derived from the reaction of unsaturated bisimides and polyamines. The bisimide can be expressed by the formula

I

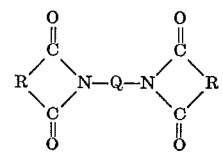

where R is a member selected from the class consisting of the (II)

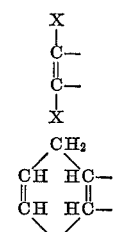

(III)

and (IV)

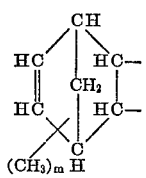

groupings, and halogenated, e.g., chlorinated derivatives of Formulas III and IV containing up to 6 or more halogens, Q is a member selected from the class consisting of divalent organic radicals of at least 2 carbon atoms (both halogenated and unhalogenated) including but not limited to, e.g., divalent hydrocarbon radicals of up to 40 carbon atoms, and divalent groups consisting of two aryl residues attached to each other through the medium of a member selected from the class consisting of an alkylene radical of from 1 to 10 carbon atoms,

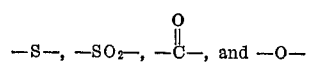

etc., X is a member of the class consisting of hydrogen, halogen, and the methyl radical, and $m$ is 0 or 1, and the methyl group in Formula IV can be present in place of any one hydrogen of the mono-hydrogen-substituted carbons.

The polyamine can be expressed by the formula (V) 

where Q is described above, it being understood, of course, that the Q in the imide and the polyamine can be different. The bisimides of Formula I can vary widely depending upon the types of organic radicals present therein. Among the divalent groupings which Q may broadly and more specifically represent are, for instance, divalent saturated alkylene radicals of up to 40 carbon atoms, for instance, 1 to 10 (e.g., ethylene, propylene, butylene, isopropylidene, hexylene, cyclohexylene, etc.), the divalent radical of diethylene oxide of the formula —CH₂—CH₂—O—CH₂—CH₂—, etc.; arylene (e.g. m-phenylene, p-phenylene, p,p'-biphenylene, dichlorophenylene, biphenylene methylene of the formula

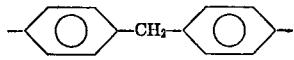

biphenylene oxide, biphenylene sulfone, biphenylene sulfide, keto biphenylene of the formula

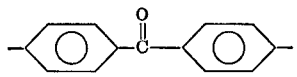

etc.), etc. Obviously, the arylene radicals may be attached to nitrogen through the ortho, meta or para positions.

Typical examples of the bis-imides which can be empolyed with the polyamine compound of Formula V are, for instance, N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenyldimethylsilyl-bis-maleimide,
N,N'-p,p'-diphenylmethane-bis-maleimide,
N,N'-p,p'-diphenylether-bis-maleimide,
N,N'-p,p'-diphenylthioether-bis-maleimide,
N,N'-diphenylsulfone-bis-maleimide,
N,N'-dicyclohexylmethane-bis-maleimide,
N,N'-m-xylene-bis-maleimide,
N,N'-p,p'-benzophenone-bis-maleimide,
N,N'-(3,3'-dichloro-p,p'-biphenylene)bis-maleimide,
N,N'-p,p'-diphenyl ether-bis-endomethylene-tetrahydrophthalimide,
N,N'-p,p'-diphenylmethane-bis-tetrahydrophthalimide, etc.

Halogenated derivatives of such bis-imides where halogen is on the anhydride portion of the imide and on an aryl nucleus can also be employed without departing from the scope of the invention, e.g., N,N'-(3,3'-dichloro-4,4'-biphenyloxy)-bis-maleimide, N,N' - (3,3' - dibromo-4,4' - diphenylmethane) - bis - dichloromaleimide, N,N'-4,4' - diphenylmethane - bis-hexachloro-endomethylene-tetrahydrophthalimide, etc.

Among the specific polyamines which are useful in connection with the present invention, alone or in admixture, are those listed below:

p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H₂N(CH₂)₃O(CH₂)₂O(CH₂)₃NH₂
H₂N(CH₂)₃S(CH₂)₃NH₂
H₂N(CH₂)₃N(CH₃)(CH₂)₃NH₂
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline of formula

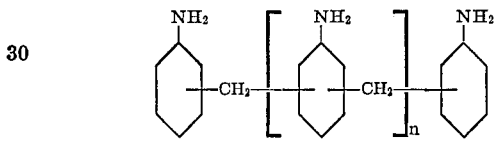

where n is from about 0.1 to 10 and preferably about 0.3.

As pointed out above, such polyimide materials are not readily processible or flowable at reasonably low temperatures particularly when filled with particulate or other types of fillers or extenders. It has been unexpectedly found that such polyimides can be readily worked at relatively low temperatures of the order of 100° C. if there is blended therewith from about 3 to 30 percent by weight of monomer selected from diallyl isophthalate and N-vinyl pyrrolidone and mixtures thereof. It has also been found advantageous in order to achieve specific physical electrical or physical characteristics to blend with the resinous composition from about 5 to 45 percent of filler such as carbon particles, carbon microspheres, silica microballoons, glass microballons, and the like, such compositions also being readily worked. In addition, other well known fillers whose purpose is to impart specific physical characteristics such as high dielectric constant or other electrical characteristics can be used. In some instances the monomeric material is advantageously dissolved in an alcohol, preferably aliphatic alcohol boiling below the polymer cure temperature, to provide better foaming characteristics where this is a desired quality. Such alcohols are used in amounts ranging from about 1 to 10 percent by weight of the composition.

The following examples illustrate the practice of the present invention and are not to be taken as limiting in any way. In a flask equipped with stirrer, reflux condenser and under a nitrogen atmosphere there were placed 164 g. of 2-methoxyethyl acetate. The solvent was heated to gentle reflux and 29.7 g. (0.15 mole) of methylenedianiline were added followed by 134.3 g. (0.374 mole) of the bismaleimide of methylene dianiline. The reaction temperature was maintained at gentle reflux for 4¼ hours. The cooled solution has a Gardner viscosity of about I and a primary amine content of about 1.3. The polymer may be used as is for coating glass cloth or it may be precipitated by drowning as in methanol with agitation. The precipitate polymer is filtered, washed with methanol and vacuum dried overnight at 30 to 35° C. to produce a powder used in the below examples.

EXAMPLE 1

There were blended together for two hours on a roll mill 85 g. of finely powdered polyimide resin and 15 g. of carbon microspheres known as Carbo-Spheres, and the particle size of such spheres ranging from 5 to 150 microns, and having a bulk density of about 0.13 to 0.14 g. per cc. and average particle size of 40 microns and an approximate wall thickness of 1 to 2 microns, the spheres being filled with inert gas and being adaptable to pouring, mixing and stirring without breaking. The blended product was then warmed to 120° C. and at this point did not show any sign of flowing. When the temperature was raised to 170° C., the material cured to a hard, tough material having a number of surface imperfections.

EXAMPLE 2

Ten grams of the finely powdered resin-carbon microsphere mixture as in Example 1 were blended with 5 g. of diallyl isophthalate on a roll mill for 2 hours. When warmed at 90° C. for 20 minutes, the product became putty-like and at 125° C. flowed readily and could be easily worked with a knife. After curing at 150° C. for 1½ hours, it was a hard, foam-like material. After 24 hours at 250° C. the loss in weight was 1.32 percent. This example illustrates the achievement of good workability with such a polyimide at reasonably low temperatures.

EXAMPLE 3

There were blended on a roll mill for 2 hours 80 g. of the powdered polymide resin and 20 g. of carbon microspheres as in Example 1. To the mixture there was added and mixed thoroughly a dispersion of 8 g. of diallyl isophthalate in 90 g. of secondary butyl alcohol. The resulting material was a soft putty which could be worked at room temperature with a knife. On warming to 90° C., the alcohol distilled off leaving a soft, putty-like product. When raised to 120° C., the putty became very foamy and expanded out of the container to four or five times its original volume. This example illustrates the usefulness of the present materials in filling spaces where light weight and thermal resistance are desired.

EXAMPLE 4

There were mixed as in Example 1, 74 parts of powdered polyimide resin with 26 parts of carbon microspheres. To a portion of the so mixed material weighing 940 g., there were added 400 g. of diallyl isophthalate, the mixture being blended for 2 hours on a roll mill. This material containing 29.85 percent by weight of diallyl isophthalate was a soft putty at 90° C. with was flowable and easily worked. The percent weight loss on curing for 1½ hours at 160° C. was 1.7 percent, the surface after cure being smooth. The percent weight loss after 24 hours at 250° C. was 1.6 percent and the compressive strength after such treatment was 10,400 p.s.i.

EXAMPLE 5

To another 940 g. portion of the resin-carbon microsphere mixture of Example 4 there were added 300 g. of diallyl isophthalate representing 22.38 percent by weight, the mixture being blended, again as in Example 4. At 90° C. the material was putty-like in nature and flowed slightly. The percent weight loss on curing for 1½ hours at 160° C. was 1.4 percent and the surface was smooth. The weight loss after 24 hours at 250° C. was 1.2 percent and the compressive strength was 9850 p.s.i.

EXAMPLE 6

To a third 940 g. portion of the resin-carbon microsphere material of Example 4 there were added 200 g. of diallyl isophthalate or 14.92 percent by weight, the mixture again being blended as in Example 4. At 90° C. the material was a putty which after curing for 1½ hours at 160° C. lost 0.9 percent by weight and had a rought surface. The percent weight loss after 24 hours at 250° C. was 0.8 percent and the compressive strength was 10,130 p.s.i.

EXAMPLE 7

There were blended for 2 hours in a jar 87 g. of polyimide resin and 30.6 g. (18.3 percent by weight) of carbon microspheres as above. There were then added 50 g. of diallyl isophthalate and the blending continued 12 more hours. When warmed to 90° C. the material flowed slightly.

EXAMPLE 8

Example 7 was repeated using 16 g. or 10.5 percent by weight of carbon spheres. At room temperature the surface of the mixture was slightly wet and when warmed to 90° C. the material was moderately flowable.

EXAMPLE 9

Example 7 was repeated except that 8 g. (5.5 percent by weight) of carbon microspheres were used, the appearance of the blended material being putty-like in nature. At 90° C. the product possessed excellent flow characteristics.

EXAMPLE 10

There were blended together for 2 hours on a roll mill 60 g. of powdered polyimide resin and 40 g. of high silica glass microspheres known as Eccospheres, such spheres having a bulk density of about 0.17 g. per cc., a particle size range of from 30 to 125 microns and a wall thickness of about 2 microns. Fourteen grams of the mixture were cured in an aluminum dish at 180° C. for one hour, the cured surface being rough and very little flow evident. After further curing for one hour at 250° C., the dish was placed in boiling water for 2 hours resulting in a loss of weight of about 1.3 g. indicating very mild water attack.

EXAMPLE 11

There were mixed together 120 g. of a 50 percent by weight solution of the above polyimide in 2-methoxy ethyl acetate and 40 g. of high silica glass microspheres similar to those of Example 10. After mixing in a rotating jar for 2 hours, a smooth, putty-like compound was obtained which was spread on an aluminum sheet and allowed to air dry for 48 hours. It was then vacuum dried at 50° C. for 8 hours to give a total of 82.5 g. of a dry powder which contained 58 percent by weight resin, 39 percent glass beads and 3 percent solvent. A 14 gram disk of this product cured at 180° C. for one hour on an aluminum dish had a smooth surface after post-baking for one hour at 250° C. and placed in boiling water for 2 hours. No attack was evident. Neither was any evidence of attack apparent after allowing the sample to stand in water for one week. After 24 hours at 250° C., the percent weight loss was 0.42 percent.

EXAMPLE 12

A mixture was prepared from 122 g. of glass microspheres as above and 347 g. of powdered polyimide resin, there being added to the mix 200 g. of diallyl isophthalate followed by blending for 2 hours. A molded disk cured at 180° C. for one hour had a density of 0.45.

EXAMPLE 13

A mixture of 70 g. of the powdered polyimide resin, 20 g. of N-vinyl pyrrolidone and 10 g. of the diallyl isophthalate was warmed at 50–55° C. to yield a paste-like mass. Of this mixture, 20 g. were cured at 150° C. for one hour to produce a hard, tough, glass product which on further heating at 250° C. for 24 hours became hard and brittle. When 10 g. of carbon microspheres as above were mixed with 75 g. of the above paste, the product cured to a tough disk after baking for one hour at 150°

C., the weight loss during cure being 2.2 percent by weight.

EXAMPLE 14

To a 50 percent by weight mixture of powdered polyimide and N-vinyl pyrrolidone there was added 15 percent by weight of glass beads as above. The resulting paste was easily workable at room temperature and could be spread with a knife. It cured to a hard, tough product at 150 to 155° C. The addition of diallyl isophthalate made the paste more flowable. Ten percent by weight addition of this material producing a disk when cured at 150 to 155° C. for 6 hours lost 2½ percent by weight when further baked at 250° C. for 16 hours.

There are provided, then, by the present invention polymeric compositions which are readily worked into final form and cured at reasonably low temperatures and which are resistant to elevated temperatures and humidity. The compositions can further be filled with various types of fillers to provide a variety of final physical characteristics. For example, they can be filled with small, hollow particles which provide an ablative effect which is useful in nose cones and gas turbine applications where a renewable surface is indicated. The use of such hollow particles also makes feasible structural parts for aerospace and other applications where low density and high temperature resistance and strength are indicated. The compositions can also be filled in addition with particulate matter which provides specific electrical characteristics combined with light weight.

What I claim as new and desire to secure by Letters Patent of the United States is:

1. A resinous composition comprising the polyimide reaction product of bisimide having the formula (I) 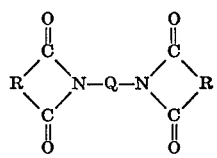

where R is a member selected from the class consisting of (II) 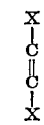

(III) 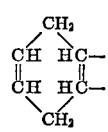

and (IV) 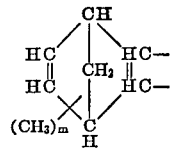

groupings, and halogenated derivatives of Formulas III and IV containing up to 6 or more halogens, Q is a member selected from the class consisting of divalent organic radicals of at least 2 carbon atoms, divalent hydrocarbon radicals of up to 40 carbon atoms, and divalent groups consisting of two aryl residues attached to each other through the medium of a member selected from the class consisting of an alkylene radical of from 1 to 10 carbon atoms,

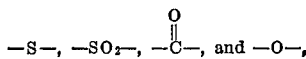

X is a member of the class consisting of hydrogen, halogen, and the methyl radical, and $m$ is 0 or 1, the methyl group in Formula IV can be present in place of any one hydrogen of the mono-hydrogen-substituted carbons, and polyamine having the formula (V) 

where Q and X are defined as above, and monomer selected from diallyl phthalate and N-vinylpyrrolidone and mixtures thereof, said monomer comprising from about 3 to 30 percent by weight of the composition.

2. The filled composition of claim 1.
3. The composition of claim 2 which contains from about 1 to 10 percent by weight of alcohol.
4. The composition of claim 1 in which said filler comprises from about 5 to 45 percent by weight of said composition.
5. The cured composition of claim 1.
6. The composition of claim 2 in which said filler comprises small, hollow particles.

References Cited
UNITED STATES PATENTS 3,562,223  2/1971  Bargain _____ 260—78 UA
3,669,930  6/1972  Asahara et al. ____ 260—78 UA MURRAY TILLMAN, Primary Examiner M. FOELAK, Assistant Examiner U.S. Cl. X.R.

117—161 UA, UN; 260—31.4, 41 R, 47 CZ, 47 UA, 65, 78 UA, 857 PR